(12) United States Patent
Jeong et al.

(10) Patent No.: US 9,480,950 B2
(45) Date of Patent: Nov. 1, 2016

(54) SEPARATION MEMBRANE FOR MEMBRANE DISTILLATION

(71) Applicant: Korea Institute of Science and Technology, Seoul (KR)

(72) Inventors: Seongpil Jeong, Seoul (KR); Seockheon Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 14/613,753

(22) Filed: Feb. 4, 2015

(65) Prior Publication Data

US 2015/0217233 A1    Aug. 6, 2015

(30) Foreign Application Priority Data

Feb. 4, 2014 (KR) ........................ 10-2014-0012758

(51) Int. Cl.
| | | |
|---|---|---|
| *B01D 39/00* | (2006.01) | |
| *B01D 63/00* | (2006.01) | |
| *B01D 27/06* | (2006.01) | |
| *B01D 27/07* | (2006.01) | |
| *B01D 61/36* | (2006.01) | |
| *B01D 63/14* | (2006.01) | |
| *B01D 69/06* | (2006.01) | |
| *C02F 1/44* | (2006.01) | |

(52) U.S. Cl.
CPC ............ *B01D 61/366* (2013.01); *B01D 63/14* (2013.01); *B01D 69/06* (2013.01); *B01D 61/364* (2013.01); *B01D 2313/025* (2013.01)

(58) Field of Classification Search
CPC .......... B01D 2311/2669; B01D 63/14; B01D 2319/02; B01D 61/366; B01D 61/364
See application file for complete search history.

(56) References Cited

U.S. PATENT DOCUMENTS

| | | | | |
|---|---|---|---|---|
| 3,513,982 A * | 5/1970 | Carter | .................... | B01D 35/18 210/232 |
| 4,545,862 A * | 10/1985 | Gore | .................... | B01D 61/364 159/DIG. 27 |
| 4,617,122 A * | 10/1986 | Kruse | .................. | B01D 46/523 210/493.3 |
| 4,879,041 A * | 11/1989 | Kurokawa | ............... | B01D 3/06 210/640 |
| 5,102,550 A * | 4/1992 | Pizzino | ................ | B01D 61/364 210/321.78 |
| 5,232,085 A * | 8/1993 | Hayashi | ................. | B01D 1/305 159/DIG. 27 |
| 5,979,668 A * | 11/1999 | Kane | ...................... | B01D 29/05 210/446 |
| 7,261,814 B2 * | 8/2007 | Peet | ...................... | B01D 29/012 210/232 |
| 9,038,830 B2 * | 5/2015 | Lucas | .................... | B01D 25/26 210/493.1 |
| 2007/0012624 A1 * | 1/2007 | Bacino | ............... | B01D 39/1692 210/650 |
| 2011/0285038 A1 * | 11/2011 | Lin | ...................... | A61M 1/1698 261/101 |
| 2013/0199985 A1 * | 8/2013 | Lucas | .................... | B01D 25/26 210/252 |

* cited by examiner

*Primary Examiner* — Ana Fortuna
(74) *Attorney, Agent, or Firm* — NSIP Law

(57) ABSTRACT

Disclosed is a separation membrane for membrane distillation, including a feed water side for feeding raw water and a treated water side for discharging treated water, wherein the separation membrane is provided in bent form by a support frame.

6 Claims, 1 Drawing Sheet

SEPARATION MEMBRANE FOR MEMBRANE DISTILLATION

CROSS-REFERENCE TO RELATED APPLICATIONS

This application claims the benefit of Korean Application No. 10-2014-0012758, filed on Feb. 4, 2014 in the Korean Intellectual Property Office, the entire disclosure of which is incorporated herein by reference for all purposes.

BACKGROUND OF THE INVENTION

1. Field of the Invention

The present invention relates to a separation membrane for water treatment, the membrane being used in a water treatment process, especially a membrane distillation process.

2. Description of the Related Art

A membrane distillation process is performed in such a manner that phase changes occur on the surface of a hydrophobic polymer separation membrane and the resulting vapor passes through the surface micropores of the separation membrane and is thus condensed and separated. This process is applied to a desalting process for separating and removing a non-volatile material or a material having relatively low volatility, or to separation of an organic material having high volatility from an aqueous solution.

Thorough research into membrane distillation began in 1960 at which the concept of membrane distillation was first proposed, and has been mainly carried out in U.S.A., Europe, Japan, and Australia. Furthermore, recent attempts are being made to replace a conventional separation process, which uses evaporation or a reverse osmotic membrane, with a membrane distillation process.

An evaporation process and a reverse osmosis process, both currently useful for production of pure water or for desalination, require a large quantity of energy. In particular, a reverse osmosis process is problematic because a plurality of pretreatment steps has to be implemented before use attributed to pollution and fouling, making it difficult to control the operation of the process. Moreover, since this process operates at high pressure, a large quantity of electric energy is used as a pump power source, undesirably incurring high management cost.

On the other hand, a membrane distillation process using a porous membrane may operate at low pressure compared to ultrafiltration and reverse osmosis, and enables the separation due to a partial vapor pressure difference. Also, such a membrane distillation process may play a role in separating and removing a non-volatile material such as a salt, without entrainment and without the need for a filter or a separation membrane operating at high pressure, compared to typical distillation processes.

Also, in a membrane distillation process using a hydrophobic polymer separation membrane, a solvent or solute (a hydrophilic material) in a liquid phase does not pass through the membrane pores because the surface tension thereof is greater than that of the separation membrane, and is repelled from the surface of the separation membrane. Then, as the separating material is converted into a vapor phase at the entrances of the surface pores of the separation membrane, the resulting vapor is diffused into the pores, permeates the membrane, and is finally condensed and separated at the permeated side.

The membrane distillation process is implemented by a separation membrane module comprising a feed water side where a feed solution passes through a separation membrane and a treated water side where a separating material is condensed and separated.

When the membrane distillation process having the advantages described above is employed in a desalination (desalting) process, low utility cost and high durability of separation systems may result. Accordingly, this membrane distillation process is receiving attention as a competitive process in drinking water production around the world.

However, the membrane distillation process is disadvantageous because the separating material may pass through the separation membrane only when it is in a vapor phase, due to a vapor pressure difference between the feed water side and the treated water side, undesirably incurring low productivity compared to other water treatment processes.

Accordingly, there is required to develop technology for maximizing the yield of treated water in a membrane distillation system on a unit scale so as to increase water treatment efficiency.

SUMMARY OF THE INVENTION

Therefore, the present invention has been made keeping in mind the above problems encountered in the related art, and an object of the present invention is to provide a membrane distillation system on a unit scale, wherein from feed water that is fed to the feed water side of the membrane distillation system, the amount of vapor that reaches the treated water side through the separation membrane due to a vapor pressure difference may be increased to thereby improve water treatment efficiency.

In order to accomplish the above object, an aspect of the present invention provides a separation membrane for membrane distillation. More specifically, in a separation membrane for membrane distillation including a feed water side for feeding raw water and a treated water side for discharging treated water, the separation membrane is provided in bent form by a support frame.

In the present invention, the separation membrane is preferably a hydrophobic polymer separation membrane. As the hydrophobic polymer separation membrane, any water treatment membrane may be used so long as it comprises a hydrophobic polymer. The hydrophobic polymer may include at least one selected from among polytetrafluoroethylene (PTFE), polyvinylidene fluoride (PVDF), polysulfone (PSF), polyether sulfone (PES), polyether imide (PEI), polyimide (PI), polyethylene (PE), polypropylene (PP), and polyamide (PA).

Furthermore, the separation membrane preferably has a surface pore size of 0.1~1 μm, and a thickness of 30~60 μm.

In the present invention, the support frame preferably includes at least one opening.

Another aspect of the present invention provides a membrane distillation system including the separation membrane as above.

According to the present invention, a separation membrane for membrane distillation is provided in bent form, so that the cross-sectional area of the separation membrane through which a separating material in a vapor phase can pass from a feed water side to a treated water side is large compared to conventional planar separation membranes, thereby increasing the yield of treated water in a membrane distillation system on a unit scale.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF SPECIFIC EMBODIMENTS

Figure 1:
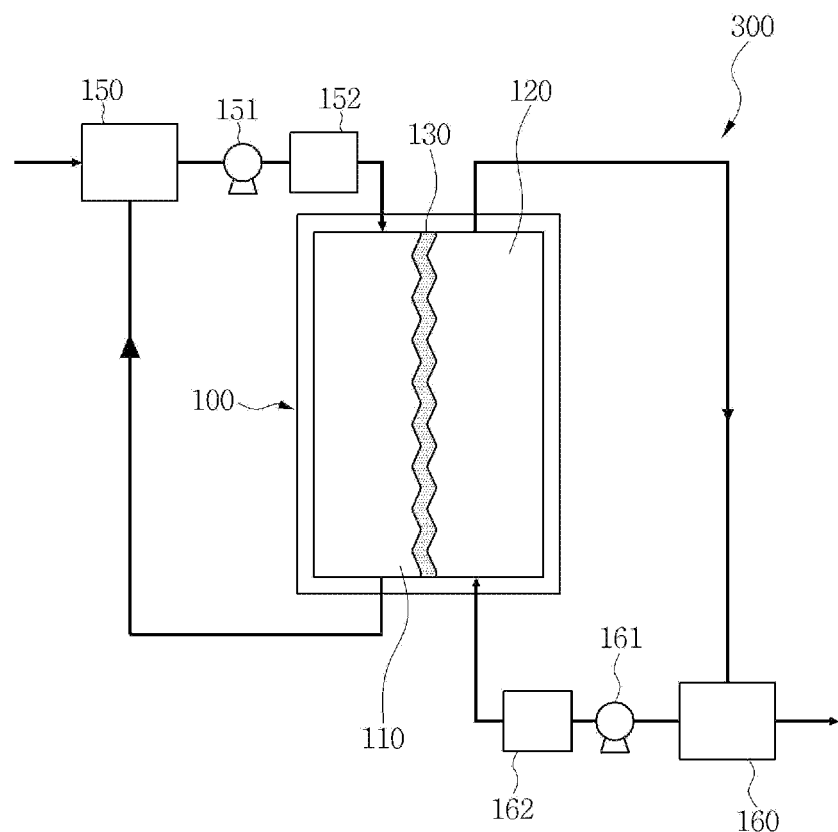
FIG. 1 illustrates a membrane distillation system including a separation membrane for membrane distillation, according to an embodiment of the present invention.

Hereinafter, a detailed description will be given of the present invention.

The present invention pertains to a separation membrane for membrane distillation. More specifically, the present invention pertains to a separation membrane for membrane distillation including a feed water side for feeding raw water and a treated water side for discharging treated water, wherein the separation membrane is provided in bent form by a support frame.

In the present invention, the separation membrane is preferably a hydrophobic polymer separation membrane. The reason why the hydrophobic polymer separation membrane is used is as follows: a solvent or solute (a hydrophilic material) in a liquid phase, having a surface tension greater than that of the separation membrane, does not pass through membrane pores but is repelled from the surface of the separation membrane, and thus, the separating material is converted into a vapor phase at the entrances of the surface pores of the separation membrane and the resulting vapor is diffused into the pores, permeates the membrane, and is finally condensed and separated at the treated water side.

As the hydrophobic polymer separation membrane, any water treatment membrane may be used so long as it comprises a hydrophobic polymer. The hydrophobic polymer may include at least one selected from among polytetrafluoroethylene (PTFE), polyvinylidene fluoride (PVDF), polysulfone (PSF), polyether sulfone (PES), polyether imide (PEI), polyimide (PI), polyethylene (PE), polypropylene (PP), and polyamide (PA).

Also, particular limitations are not imposed on the surface pore size of the separation membrane, and the pore size may be set in the range of 0.1~1 μm depending on end uses and operating conditions. Also, the thickness of the separation membrane is not particularly limited, and may be set in the range of 20~300 μm depending on end uses and operating conditions. In order to satisfy both high membrane permeability and high membrane durability, the thickness of the separation membrane is preferably set to 30~60 μm.

In the present invention, the support frame is not particularly limited, and is made of a material having a low heat transfer rate, such as plastic or crystalline material. Alternatively useful is a material having a high heat transfer rate, including a metal such as iron, aluminum or copper, or carbon nanotubes. In some cases, a material having a high heat transfer rate and a material having a low heat transfer rate may be used together, and a combination of materials having different heat transfer rates may be applied.

Also, the support frame is provided in bent form, and the shape thereof is not particularly limited. For example, any shape, including an angular shape, a rounded shape, etc., may be applied. Useful is preferably a shape where the contact cross-sectional area is large compared to a plane, and more preferably, a folding screen shape in which a bent form is repeated.

The support frame has at least one opening, and the shape of the opening is not particularly limited, and may include at least one of a polygonal shape and a circular shape, depending on end uses.

Furthermore, examples of fixing the separation membrane to the support frame may include attaching a separation membrane to a support frame using an adhesive, fitting a separation membrane into an opening of a support frame, and fitting a separation membrane into a gap additionally formed in a support frame. Fixing the separation membrane to the support frame is not particularly limited, and any process may be applied so long as the separation membrane in bent form by the support frame is fixed so as to prevent detachment in the membrane distillation system or leaking problems.

Another aspect of the present invention pertains to a membrane distillation system, and particularly to a membrane distillation system including the separation membrane as above. In the present invention, the membrane distillation system includes a feed water side for feeding raw water and a treated water side for discharging treated water.

The feed water side of the membrane distillation system is a part where external raw water is passed. While passing the external raw water through the feed water side of the membrane distillation system, a vapor present in the raw water moves to the treated water side through the separation membrane due to a vapor pressure difference between the feed water side and the treated water side.

In the present invention, any raw water may be used so long as pure water needs to be separated therefrom, and examples thereof may include sewage or seawater. The raw water of the feed water side of the system has a relatively high temperature compared to the treated water of the treated water side, in order to cause a vapor pressure difference between the feed water side and the treated water side. The temperature pressure between the feed water side and the treated water side is not particularly limited, but is preferably set to 600° C. or less, taking into consideration energy efficiency and pure water yield.

Furthermore, to increase the vapor permeability through the separation membrane, the temperature of the feed water side is favorably set as high as possible. As the temperature of the feed water of the feed water side is higher, vapor pressure may increase, consequently enhancing a vapor pressure difference between the feed water side and the treated water side, which is a driving force of vapor permeation through the separation membrane.

Also, in the membrane distillation system according to the present invention, the flow of the feed water (raw water) of the feed water side may be stopped repetitively for a predetermined period of time in order to increase a water purification quantity. After a sufficient water purification quantity is obtained by stopping the flow of the feed water side, the residual raw water in the membrane distillation system is discharged to the outside, and new raw water is fed to the feed water side of the membrane distillation system, and the flow of the feed water side is stopped again. As such, the aforementioned procedures may be repeated.

Also, while raw water is continuously fed, a concentrated raw water residue (concentrated water) may be discharged at a predetermined flow rate. When a predetermined period of time has elapsed after operation or when the concentration of concentrated water is increased to a predetermined level or more, it is possible to carry out the membrane distillation process using the membrane distillation system in such a manner that the concentrated water is discharged.

According to the present invention, the membrane distillation system does not continuously maintain the flow of the feed water side, but controls the flow of feed water at a predetermined time interval. Hence, compared to a conventional membrane distillation system, pump energy required for the flow of the feed water side may be reduced.

In some cases, the feed water receiving space of the feed water side is made smaller than the treated water receiving space of the treated water side, and thereby the feed water fed into the system may be more rapidly heated. In the present invention, the ratio of the volume of the feed water receiving space of the feed water side to the volume of the treated water receiving space of the treated water side is not particularly limited, but is preferably set to 1:1.01~100. If the ratio of the volume of the feed water receiving space to the volume of the treated water receiving space is less than 1:1.01, an effect of shortening the heating time of raw water of the feed water side may become insignificant, compared to when the volume ratio is 1:1. In contrast, if the ratio of the volume of the feed water receiving space to the volume of the treated water receiving space exceeds 1:100, the volume of the feed water receiving space is too small, making it difficult to achieve the water purification quantity as desired in the present invention.

In the membrane distillation system according to the present invention, the treated water side is a part where the vapor passed through the separation membrane is condensed and separated, and the treated water that is pure water separated from the raw water through the separation membrane is collected and flows. In the present invention, the temperature of the treated water of the treated water side of the system is relatively lower than that of the feed water.

According to the present invention, the membrane distillation system may be provided in submerged or pressurized type, without particular limitation. Furthermore, the separation membrane for membrane distillation may be applied to any type of membrane distillation system, for example, a direct contact membrane distillation (DCMD) type, an air gap membrane distillation (AGMD) type, a vacuum membrane distillation (VMD) type, and a sweep gas membrane distillation (SGMD) type.

A better understanding of the present invention may be obtained via the following embodiments that are set forth to illustrate, but are not to be construed as limiting the present invention.

FIG. 1 illustrates a membrane distillation system including a separation membrane for membrane distillation according to an embodiment of the present invention. As illustrated in FIG. 1, a membrane distillation module 100 includes a feed water side 110, a treated water side 120, and a separation membrane 130.

The feed water side 110 is an area where external raw water stays in the membrane distillation module 100. While the external raw water stays in the feed water side 110, a vapor present in the raw water moves to the treated water side 120 through the separation membrane 130 due to a vapor pressure difference between the feed water side 110 and the treated water side 120.

As such, the raw water is heated by thermal energy using a heater 152, after which it is fed into the feed water side 110 and stays around the separation membrane 130. Thereby, pure water contained in the raw water of the feed water side 110 is vaporized, and the vapor pressure of the feed water side 110 is enhanced.

Referring to FIG. 1, the operation of the system according to the present invention is described below.

Specifically, raw water stored in a raw water storage tank 150 is fed into the feed water side 110 of the membrane distillation module 100 by means of a raw water circulation pump 151. As illustrated in FIG. 1, when the feed water side 110 is filled with the fed raw water, the raw water circulation pump 151 functions to prevent the raw water from flowing thereto, or may control continuous water circulation. As such, while the raw water is passed through a heater 152 before being fed into the feed water side 110, it is heated by thermal energy, so that pure water contained in the raw water is vaporized, thus enhancing the vapor pressure of the feed water side 110. On the other hand, the treated water side 120 of the separation membrane module 100 is an area where treated water is continuously circulated and flows. The treated water is allowed to flow into the membrane distillation module 100 via a treated water circulation pump 161 from a treated water storage tank 160. In this procedure, the treated water is cooled by a cooler 162, and then fed into the treated water side 120 of the membrane distillation module 100. The treated water is continuously circulated, and a portion of the treated water stored in the treated water storage tank 160 is pure water and is discharged to the outside. A temperature difference between the feed water side 110 and the treated water side 120 creates a vapor pressure difference. Also, due to the vapor pressure difference between the feed water side 110 and the treated water side 120, a vapor of pure water contained in the raw water of the feed water side 110 moves to the treated water side 120 through the separation membrane 130. Furthermore, the vapor moved to the treated water side 120 is condensed due to low temperature of the treated water side 120 and becomes pure water. As such, the separation membrane 130 is hydrophobic, and thus liquid residues other than the vaporized pure water of the feed water side 110 do not pass through the separation membrane 130.

Meanwhile, when the raw water staying in the feed water side 110 is sufficiently purified, the residual raw water of the feed water side 110 is discharged outside the membrane distillation module 100, and new raw water is fed to the feed water side 110 from the raw water storage tank 150 in response to operation of the raw water circulation pump 151. These procedures are repeated. When continuous operation is carried out, new raw water is fed into the raw water storage tank 150, so that the inner concentration of the raw water storage tank 150 may be adjusted. Thus, when the inner concentration of the raw water storage tank 150 is sufficiently increased, the raw water concentrate is removed from the raw water storage tank 150, and new raw water may be fed thereto.

Figure 2:
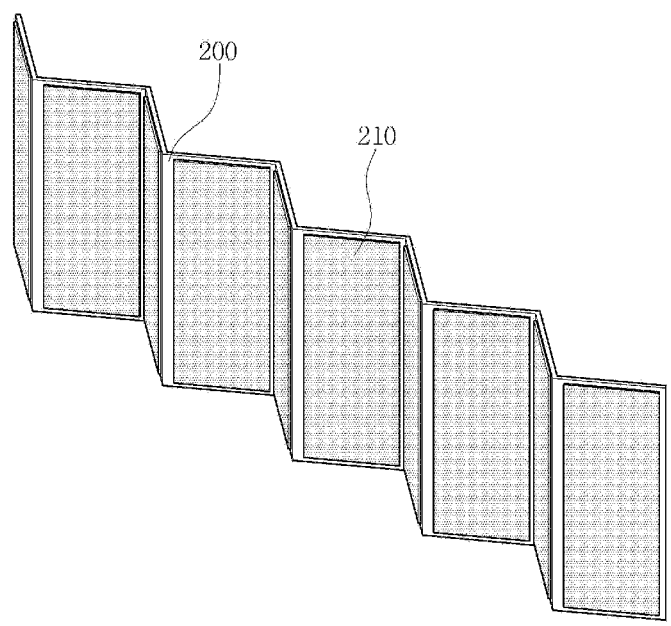
FIG. 2 illustrates a separation membrane in bent form by a support frame, according to an embodiment of the present invention.

FIG. 2 illustrates a separation membrane in bent form by a support frame according to an embodiment of the present invention. The support frame 200 is provided in a folding screen shape where an angularly bent form is repeated. The support frame includes a plurality of rectangular openings, in which rectangular separation membranes 210 are positioned.

As described hereinbefore, those skilled in the art will appreciate that the present invention may be embodied in other specific ways without changing the technical spirit or essential features thereof. The scope of the present invention is represented by the following claims, rather than the detailed description, and it is to be construed that the meaning and scope of the claims and all variations or modified forms derived from the equivalent concept thereof are encompassed within the scope of the present invention.

What is claimed is:

1. A separation membrane for membrane distillation, comprising a feed water side for feeding raw water and a treated water side for discharging treated water,
   wherein the separation membrane is provided in bent form by a support frame at a particular angle,
   wherein the support frame includes at least two openings,
   wherein the openings are comprised within the support frame, and
   wherein the membrane is fitted within the each of the openings.

2. The separation membrane of claim 1, wherein the separation membrane is a hydrophobic polymer separation membrane.

3. The separation membrane of claim 2, wherein the hydrophobic polymer separation membrane comprises at least one selected from the group consisting of polytetrafluoroethylene (PTFE), polyvinylidene fluoride (PVDF), polysulfone (PSF), polyether sulfone (PES), polyether imide (PEI), polyimide (PI), polyethylene (PE), polypropylene (PP), and polyamide (PA).

4. The separation membrane of claim 1, wherein the separation membrane has a surface pore size of 0.1~1 μm.

5. The separation membrane of claim 1, wherein the separation membrane has a thickness of 30~60 μm.

6. A membrane distillation system, comprising the separation membrane of claim 1.

* * * * *